United States Patent
Nakayama et al.

(10) Patent No.: US 7,045,703 B2
(45) Date of Patent: May 16, 2006

(54) THERMOPHOTOVOLTAIC POWER GENERATING APPARATUS

(75) Inventors: Hideki Nakayama, Susono (JP); Kiyohito Murata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 10/126,776

(22) Filed: Apr. 22, 2002

(65) Prior Publication Data

US 2002/0153035 A1 Oct. 24, 2002

(30) Foreign Application Priority Data

Apr. 23, 2001 (JP) .................................. P. 2001-124801

(51) Int. Cl.
*H01L 31/058* (2006.01)

(52) U.S. Cl. ..................... 136/253; 136/257; 431/100

(58) Field of Classification Search ................ 136/253, 136/257; 431/100
See application file for complete search history.

(56) References Cited

U.S. PATENT DOCUMENTS

| | | | |
|---|---|---|---|
| 4,707,560 A | | 11/1987 | Hottel et al. |
| 4,778,378 A | | 10/1988 | Dolnick et al. |
| 5,551,992 A | * | 9/1996 | Fraas .......................... 136/253 |
| 5,593,509 A | | 1/1997 | Zuppero et al. |
| 6,204,442 B1 | * | 3/2001 | Laqua ......................... 136/253 |
| 6,235,983 B1 | * | 5/2001 | Becker et al. ............... 136/253 |
| 6,337,437 B1 | | 1/2002 | Fraas et al. |
| 6,486,392 B1 | * | 11/2002 | Samaras et al. ............ 136/253 |
| 6,686,534 B1 | | 2/2004 | Chen |
| 6,713,774 B1 | | 3/2004 | DeSteese et al. |
| 6,768,049 B1 | * | 7/2004 | Nakayama et al. ......... 136/253 |
| 2002/0148498 A1 | * | 10/2002 | Nakayama et al. ......... 136/253 |
| 2003/0075214 A1 | * | 4/2003 | Fraas et al. ................. 136/253 |
| 2003/0116186 A1 | * | 6/2003 | Chen .......................... 136/253 |
| 2003/0230336 A1 | * | 12/2003 | Malfa et al. ................ 136/253 |
| 2004/0118450 A1 | | 6/2004 | Murata et al. |

FOREIGN PATENT DOCUMENTS

| | | | |
|---|---|---|---|
| JP | 63-316486 | | 12/1988 |
| JP | 63-316486 A | * | 12/1988 |
| JP | 2000-68545 | | 3/2000 |
| JP | 2000-106001 | | 4/2000 |
| JP | 2000-106452 | | 4/2000 |

OTHER PUBLICATIONS

*Research and Development on Organization of Environment–Conscious High Efficiency Power Generator for Next Generation*, Engineering Advancement Association of Japan, 1997 Social Development System Planning Project Report, (Mar. 1998).

* cited by examiner

*Primary Examiner*—Alan Diamond
(74) *Attorney, Agent, or Firm*—Finnegan, Henderson, Farabow, Garrett & Dunner, LLP

(57) ABSTRACT

A thermophotovoltaic power generating apparatus has a combustor for burning a fuel upon supply of the fuel and air, an emitter heated by passage therein of combustion gas produced in the combustor, and a photoelectric conversion element that converts light radiated from the emitter into electric power, the combustor being provided between the emitter and the conversion element. Preferably, the emitter is disposed above the combustor, and the photoelectric conversion element is disposed below the combustor. With this structure, combustion gas does not reside in the combustion chamber, but is discharged via the emitter disposed above the combustor. Combustion becomes stable, and the emitter is efficiently heated, so that energy radiated from the emitter surface increases.

23 Claims, 6 Drawing Sheets

THERMOPHOTOVOLTAIC POWER GENERATING APPARATUS

INCORPORATION BY REFERENCE

The disclosure of Japanese Patent Application No. 2001-124801 filed on Apr. 23, 2001 including the specification, drawings and abstract is incorporated herein by reference in its entirety.

BACKGROUND OF THE INVENTION

1. Field of the Invention

The invention relates to a thermophotovoltaic power generating apparatus (TPV system) for generating electric power through thermophotovoltaic energy conversion of infrared light (infrared ray, or heat ray) radiated from a heat source using a photoelectric conversion element (photoelectric conversion cell).

2. Description of Related Art

The thermophotovoltaic power generating apparatus causes an emitter to radiate infrared light of a constant wavelength by heating the emitter, and causes the infrared light to strike a photoelectric conversion element so that the infrared light is converted into electric power. The thermophotovoltaic power generating apparatus, having no movable portion, can be noiseless and vibration free.

Thermophotovoltaic power generation is clean and quiet. Combustion heat, solar heat, nuclear energy, etc. can be used to heat the emitter of a thermophotovoltaic power generating apparatus. Typically the emitter is heated by combustion of a fuel gas, for example, butane.

For example, a conventional thermophotovoltaic power generating apparatus includes an emitter formed from a porous solid material, an emitter heating device designed to allow combustion gas to pass through the emitter, and a photoelectric conversion element that converts energy radiated from the emitter into electric energy.

Such a thermophotovoltaic power generating apparatus, made up of a combustor, radiator and a photoelectric conversion element, is presently entering a stage of practical use. However, no optimal arrangement of those components has yet been determined.

SUMMARY OF THE INVENTION

It is an object of the invention to provide a thermophotovoltaic power generating apparatus that realizes efficient electric power generation by adopting a structure with optimally arranged component elements.

In an embodiment of the invention, a thermophotovoltaic power generating apparatus includes a combustor that receives a supply of a fuel and air for burning the fuel, a porous emitter that is heated upon passage of combustion gas generated by the combustor through an inside of the porous emitter, and a photoelectric conversion element that converts light radiated from the porous emitter into electric power, wherein the porous emitter is disposed above the combustor, and the photoelectric conversion element is disposed below the combustor.

In the thermophotovoltaic power generating apparatus according to the above-described embodiment of the invention, combustion gas does not reside in the combustion chamber, but flows through the emitter disposed above the combustor. Therefore, the state of combustion is stabilized and the emitter is efficiently heated due to heat transfer. As a result, radiant energy (radiant light) from the emitter surface increases and electric power can be generated more efficiently.

Another embodiment of the invention includes a guide member that guides the air supplied to the combustor so that the air flows toward a combustion chamber of the combustor in which the fuel is burned with the air.

In the thermophotovoltaic power generating apparatus according to another embodiment of the invention, air is reliably introduced into the combustion chamber of the combustor by the guide member. Therefore, combustion gas is efficiently discharged from the combustion chamber, resulting in stable combustion.

Another embodiment of the invention includes a filter that adjusts a wavelength of the light radiated from the porous emitter, in which the filter and the photoelectric conversion element are disposed below the combustor such that the air flows toward the filter.

In the thermophotovoltaic power generating apparatus according to the above-described embodiment of the invention, the filter can be actively cooled to prevent overheating.

Another embodiment of the invention includes an exhaust port through which the combustion gas passing through the porous emitter is discharged from an upper portion of the thermophotovoltaic power generating apparatus.

In the thermophotovoltaic power generating apparatus according to the above-described embodiment of the invention, the combustion gas that has passed through the emitter is discharged from the upper portion of the apparatus. Accordingly the combustion gas can be discharged to the outside with reduced resistance, improving the exhaust efficiency. In the case where an air-supplying compressor is employed, the apparatus may minimize the amount of electricity supplied to the compressor or the like.

Another embodiment of the invention includes a pre-combustion chamber near the combustor, the pre-combustion chamber allowing pre-mixing of the fuel and air.

In the thermophotovoltaic power generating apparatus according to the above-described embodiment of the invention, pre-mixing of the air and fuel may maintain a state where air is constantly supplied, resulting in stabilized combustion.

Another embodiment of the invention includes a filter that adjusts a wavelength of the light radiated from the porous emitter, and a pipe that supplies the air. The pipe extends to a position in the vicinity of the filter to which the air is directly applied.

In the thermophotovoltaic power generating according to the above-described embodiment of the invention, the filter is further effectively cooled, and air is reliably supplied into the combustion chamber.

Another embodiment of the invention includes a filter that adjusts a wavelength of the light radiated from the porous emitter, a pipe that supplies the fuel, and a pipe that supplies the air. The pipes that supply the fuel and the air are respectively provided in the combustion chamber of the combustor in which the fuel is burned with the air.

In the thermophotovoltaic power generating according to the above-described embodiment of the invention, air can be supplied from the air piping to the entire area of a surface of the filter. The temperature in the surfaces of the filter and the photoelectric conversion element can be more uniformly reduced. Furthermore, since the air piping is provided in the combustion chamber, air can be reliably supplied so as to stabilize combustion.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
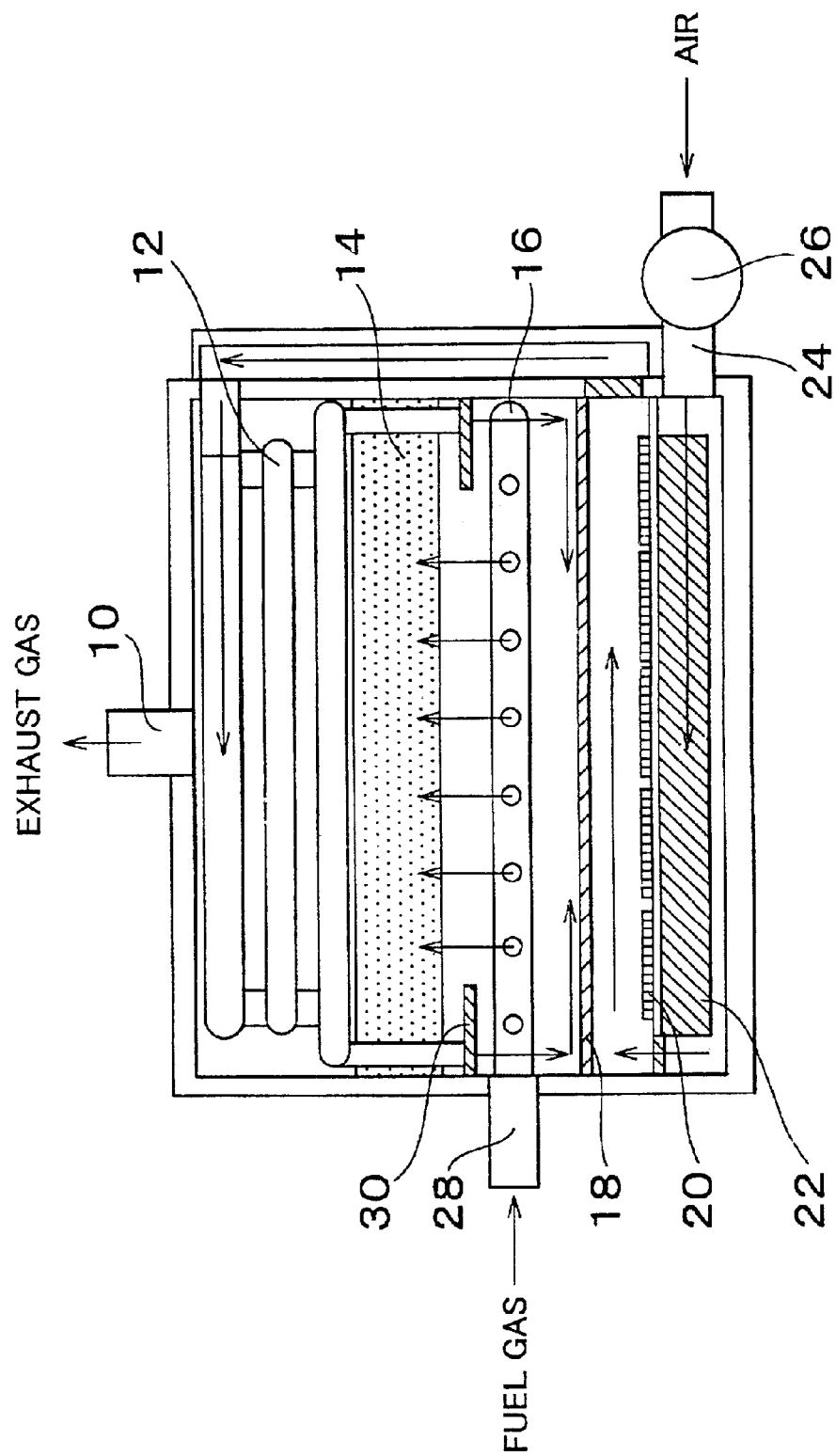
FIG. 1 is an elevation with a partial sectional view of a thermophotovoltaic power generating apparatus in accordance with a first embodiment of the invention.
Figure 2:
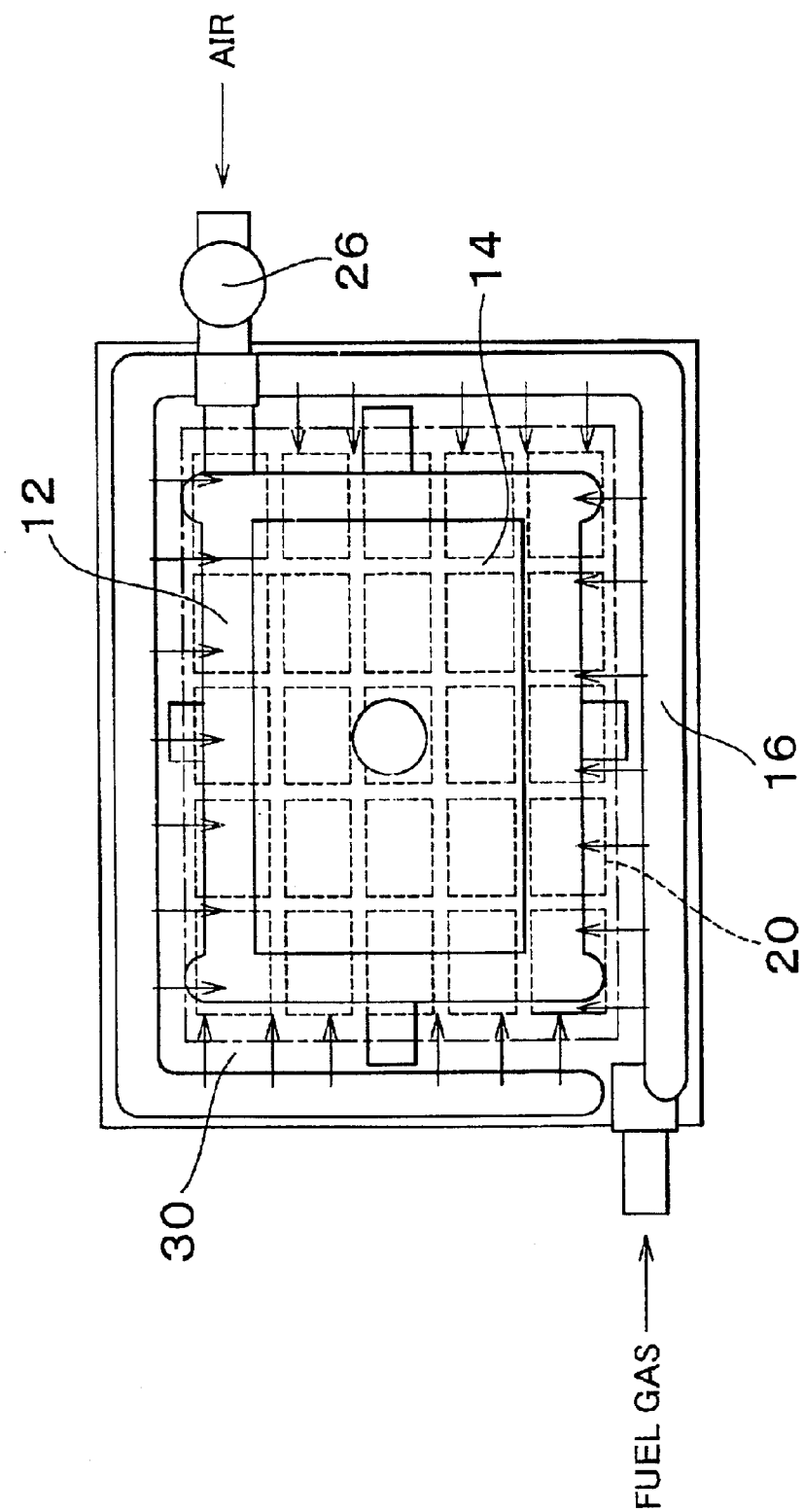
FIG. 2 is a plan view with a partial sectional view of the thermophotovoltaic power generating apparatus in accordance with the first embodiment of the invention.

FIG. 1 is an elevation with a partial sectional view of a thermophotovoltaic power generating apparatus in accordance with a first preferred embodiment of the invention. FIG. 2 is a plan view with a partial sectional view of the thermophotovoltaic power generating apparatus of FIG. 1. This thermophotovoltaic power generating apparatus has a structure in which an exhaust pipe 10, a heat exchange portion 12, an emitter 14 of a porous material, a combustor (burner) 16, a wavelength selecting filter 18, and a plurality of photoelectric conversion cells 20 are arranged in that order from an upper side as shown in FIG. 1. A combustion chamber is defined by a space between the emitter 14 and the filter 18 where the combustor 16 is disposed.

Disposed below the photoelectric conversion cells 20 is a heat sink 22 for absorbing heat from the photoelectric conversion cells 20, which preferably are semiconductor devices, and for dissipating heat to the outside. An air pipe 24 is disposed for introducing air for combustion. A compressor 26 is provided in an intermediate portion of the air pipe 24.

Air compressed by the compressor 26 passes along the heat sink 22, and passes along surface portions of the photoelectric conversion cells 20. Thus, the air is used to cool the photoelectric conversion cells 20.

Subsequently, the air is led to the heat exchange portion 12 via piping provided on a side surface of the apparatus, and flows through piping provided in the heat exchange portion 12. Heat exchange occurs between the air and combustion gas that has heated the emitter, as described below. The air heated by heat exchange is introduced into the combustion chamber in which the combustor 16 is disposed, and is also actively caused to flow toward the filter 18.

A fuel gas is supplied from a fuel pipe 28 to the combustor 16. The combustor 16 is formed into a generally rectangular shape using cylindrical piping. The combustor 16 has ejection apertures at predetermined spaced intervals, through which the fuel gas is ejected inwardly in horizontal directions. Air is introduced into the combustion chamber as mentioned above. The fuel gas is ignited at the ejection apertures, and burns, forming flames extending substantially in the horizontal directions.

Combustion gas produced by burning the fuel flows upward in FIG. 1 and passes through the interior of the porous emitter 14. The emitter 14 is heated by the high-temperature combustion gas flowing therethrough. The emitter 14 then radiates infrared light from its lower surface such that the radiated infrared light reaches the filter 18.

The filter 18 selectively transmits a wavelength component that contributes to photoelectric conversion, and reflects a component that does not contribute to the photoelectric conversion, toward the emitter 14. The reflected component is used to heat the emitter 14. The infrared light transmitted through the filter 18 strikes the photoelectric conversion cells 20, and is converted into electric power.

The combustion gas that has heated the emitter 14 while flowing through the emitter 14 heats air in the heat exchange portion 12, and then is discharged via an exhaust pipe 10 mounted on the upper portion of the apparatus of the first embodiment of the invention.

As described above, in this embodiment, the air for combustion is used to cool the photoelectric conversion cells 20. This helps avoid reduced photoelectric conversion efficiency that would otherwise be caused by a temperature rise of the photoelectric conversion cells 20.

The combustion gas that has heated the emitter 14 is also used to preheat the air needed for combustion. Since the pre-heated air and the fuel bum, the temperature of the combustion gas increases, and the temperature of the emitter 14 correspondingly increases. As a result, the intensity of radiation from the emitter 14 increases in turn. Thus, the electric power generated by the photoelectric conversion cells 20 also increases.

In the thermophotovoltaic power generating apparatus shown in FIGS. 1 and 2, the exhaust pipe 10, the heat exchange portion 12, the emitter 14, the combustor 16, the filter 18, and the photoelectric conversion cells 20 are arranged in that order descending from the upper side as depicted in FIG. 1. It is also conceivable, however, to adopt a reverse structure in which the exhaust pipe 10, the heat exchange portion 12, the emitter 14, the combustor 16, the filter 18, and the photoelectric conversion cells 20 are arranged in that order ascending from a lower side of the apparatus as shown in FIG. 3.

Figure 3:
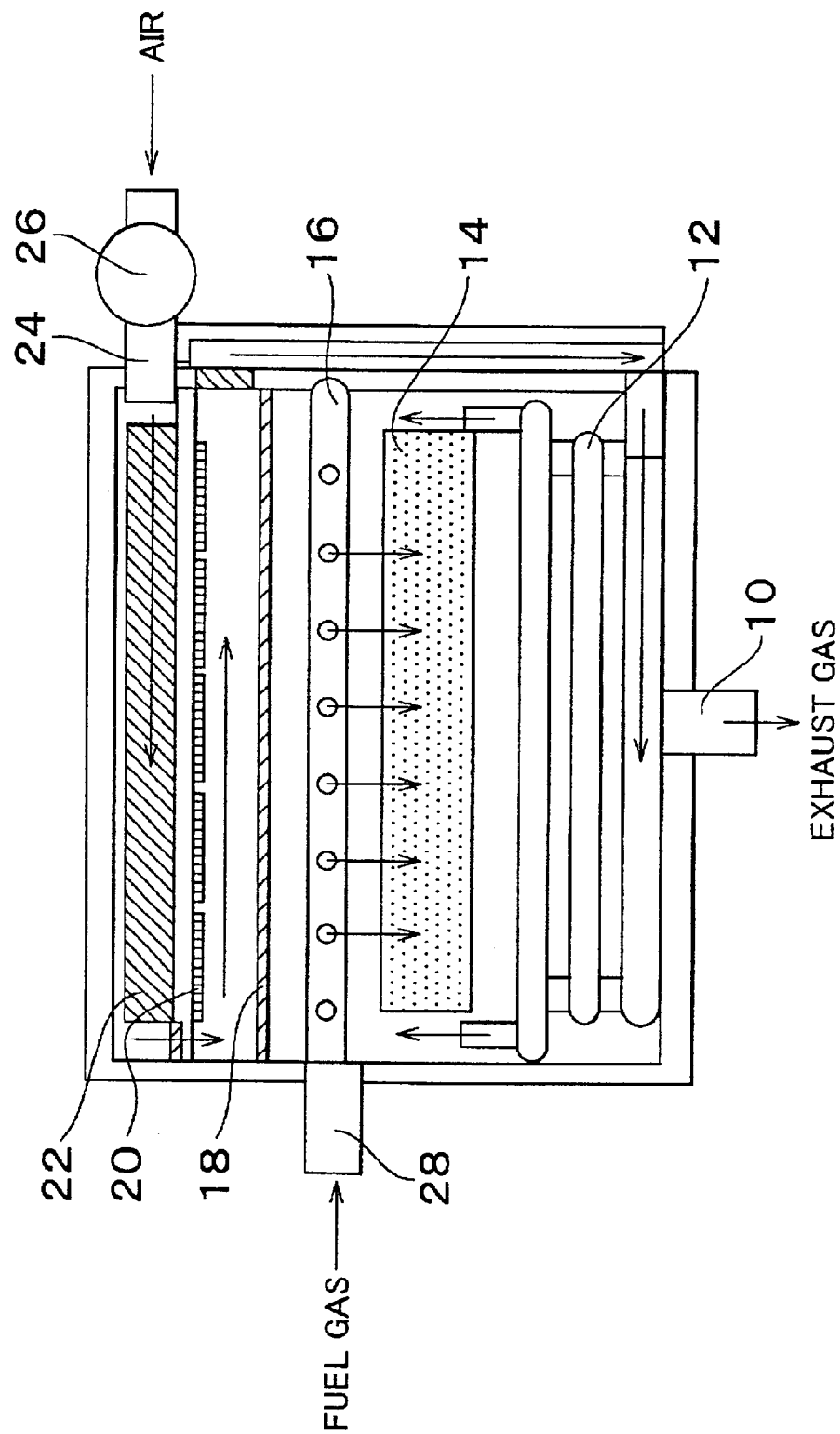
FIG. 3 is an elevation with a partial sectional view of a comparative example with respect to the thermophotovoltaic power generating apparatus of the first embodiment.

When the emitter 14 is disposed below the combustor 16, and the filter 18 and the photoelectric conversion cells 20 are disposed above the combustor 16 as shown in FIG. 3, high-temperature combustion gas ($CO_2$, and unburned gas) remains in the combustion chamber. That is, combustion gas is not efficiently discharged, so combustion becomes unstable.

In order to efficiently discharge combustion gas from the combustion chamber in the structure shown in FIG. 3, it is preferable to adopt a method in which the amount of air supplied is increased, forced suction of gas is performed from the side of the exhaust pipe, etc. However, if the amount of air supplied is increased, reduced combustion gas temperature can occur, and a pump may be required for forced suction of gas is performed from the side of the exhaust pipe.

Furthermore, if the filter 18 and the photoelectric conversion cells 20 are disposed above the combustor 16 as shown in FIG. 3, the filter and the cells are excessively heated by high-temperature combustion gas, and power generating performance deteriorates.

When the emitter 14 is disposed above the combustor 16, and the filter 18 and the photoelectric conversion cells 20 are disposed below the combustor 16 as shown in FIG. 1, however, high-temperature combustion gas does not reside in the combustion chamber, but instead is discharged via the porous emitter 14 disposed above.

Therefore, combustion is stabilized, and the emitter 14 is heated to a high temperature due to heat transfer caused by the combustion. The energy radiated from the emitter surface correspondingly increases. As a result, the amount of electric power generation on the cell surfaces increases, and power generating performance improves.

In the embodiment shown in FIG. 1, guide plates 30 preferably are provided as guide members for guiding the current of air flowing toward the combustion chamber between the emitter 14 and the combustion chamber. By reliably introducing air into the combustion chamber via the guide plates 30, combustion gas is efficiently discharged from the combustion chamber in order to stabilize the combustion.

Furthermore, the guide plates 30 allow air to reach and cool the filter 18. Therefore, overheating of the filter 18 can be prevented. In the structure shown in FIG. 3, in contrast, as the filter 18 is heated to a high temperature by stagnant combustion gas, a dielectric multi-layer film coating cannot be provided on the combustion chamber side. Hence, it is necessary to adopt a filter structure in which a quartz baseboard is disposed on the combustion chamber side and a filter film is disposed on the cell side. If this structure is adopted, the quartz baseboard absorbs light, so that a reflection re-absorption rate of the filter film is reduced and the electric power generating performance drops. In the structure shown in FIG. 1, in contrast, the temperature of the filter remains low, and a filter film can be formed on the combustion chamber side by vapor deposition. Hence, the light absorption by the quartz baseboard can be reduced, so that the electric power generating performance improves.

Still further, the structure in which the emitter 14 is disposed above the combustor 16 as shown in FIG. 1 may improve the exhaust efficiency. Therefore, the amount of electricity supplied to the compressor 26 to supply air can be reduced. In this respect, the performance of the TPV system improves.

Figure 4:
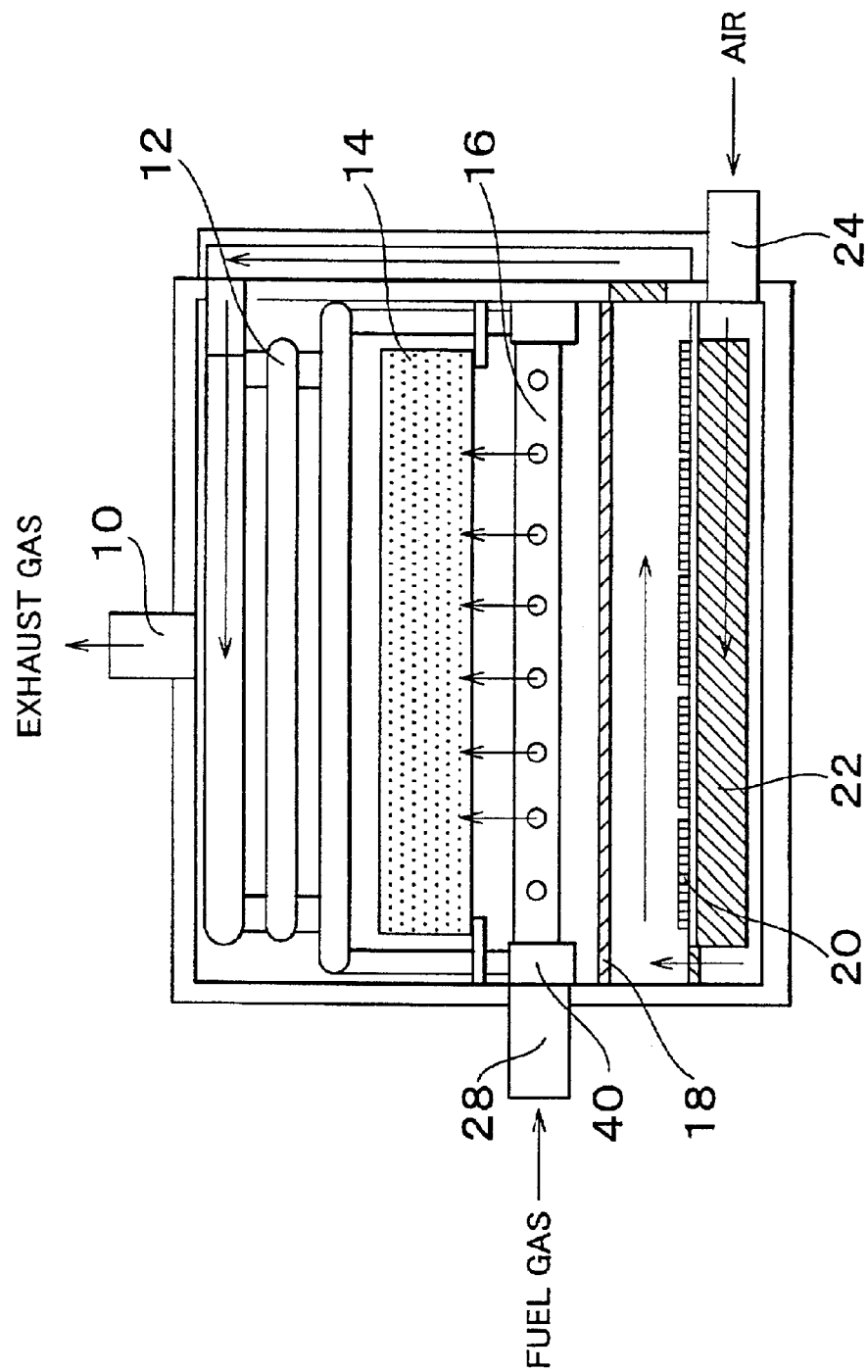
FIG. 4 is an elevation with a partial sectional view of a thermophotovoltaic power generating apparatus in accordance with another embodiment of the invention.

FIG. 4 is an elevation with a partial sectional view of a construction of a thermophotovoltaic power generating apparatus in accordance with another embodiment of the invention. In FIG. 4, elements identical to those shown in FIG. 1 are represented by identical reference numerals. The description of such elements will be omitted. In this embodiment, a pre-mixing chamber 40 is provided in which air and a fuel gas are pre-mixed. Thus, air is always supplied, stabilizing the state of combustion.

Figure 5:
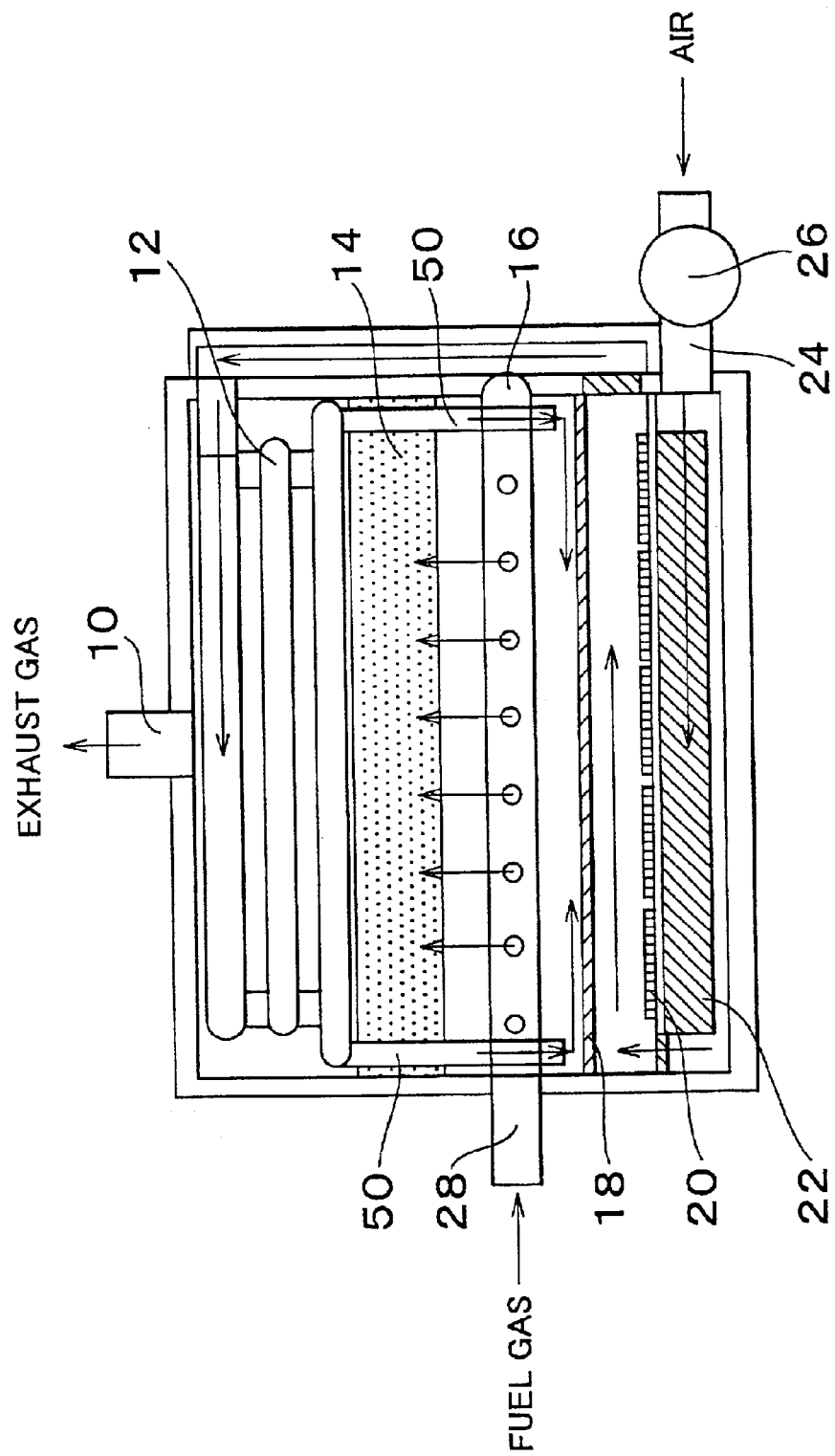
FIG. 5 is an elevation with a partial sectional view of a thermophotovoltaic power generating apparatus in accordance with another embodiment of the invention.

FIG. 5 is an elevation with a partial sectional view of a construction of a thermophotovoltaic power generating apparatus in accordance with another embodiment of the invention. In FIG. 5, elements identical to those shown in FIG. 1 are represented by identical reference numerals. The description of such elements will be omitted. In this embodiment, an air pipe 50 extends to the vicinity of filter 18, so that air directly strikes the filter 18. Therefore, filter cooling is enhanced, and air is reliably supplied to the combustion chamber.

Figure 6:
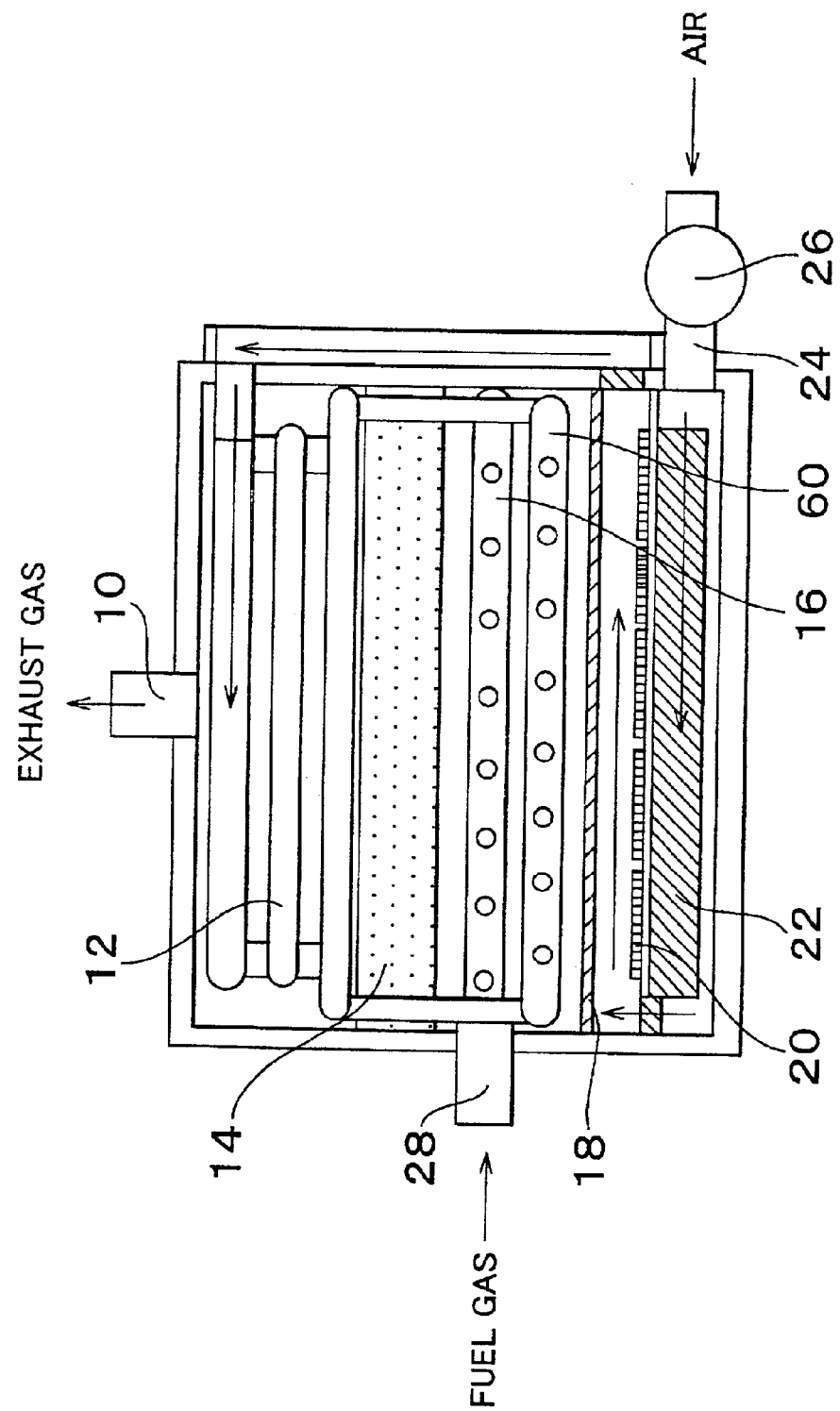
FIG. 6 is an elevation with a partial sectional view of a thermophotovoltaic power generating apparatus in accordance with another embodiment of the invention.

FIG. 6 is an elevation with a partial sectional view of a construction of a thermophotovoltaic power generating apparatus in accordance with still another embodiment of the invention. In FIG. 6, elements identical to those shown in FIG. 1 are represented by identical reference numerals. The description of such elements will be omitted. In this embodiment, an air pipe 60 is laid above a filter 18 disposed in a combustion chamber. Thus, a double structure is formed by the air pipe and fuel gas piping.

In this embodiment, air can be supplied from opening portions of the air pipe 60 to the entire area of the filter 18, the temperature in the surfaces of the filter 18 and the photoelectric conversion cells 20 can be uniformly reduced. Furthermore, since an air pipe is provided in the combustion chamber, air can be reliably supplied, stabilizing combustion.

As is apparent from the foregoing description, optimal arrangement of the component elements in the thermophotovoltaic power generating apparatus allows efficient electric power generation.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A thermophotovoltaic power generating apparatus comprising:
   a combustor that receives a supply of a fuel and air for burning the fuel;
   an emitter that is heated upon passage of a combustion gas generated by the combustor through an interior of the emitter; and
   a photoelectric conversion element that converts light radiated from the emitter into electric power, wherein the emitter is disposed above the combustor, and the photoelectric conversion element is disposed below the combustor.

2. A thermophotovoltaic power generating apparatus according to claim 1, further comprising a guide member that guides the air supplied to the combustor so that the air flows toward a combustion chamber of the combustor in which the fuel is burned with the air.

3. A thermophotovoltaic power generating apparatus according to claim 1, further comprising a filter that adjusts a wavelength of the light radiated from the emitter, wherein the filter and the photoelectric conversion element are disposed below the combustor, and the air flows toward the filter.

4. A thermophotovoltaic power generating apparatus according to claim 1, further comprising an exhaust port through which the combustion gas passing through the emitter is discharged from an upper portion of the thermophotovoltaic power generating apparatus.

5. A thermophotovoltaic power generating apparatus according to claim 1, further comprising a pre-combustion chamber near the combustor, the pre-combustion chamber allowing pre-mixing of the fuel and the air.

6. A thermophotovoltaic power generating apparatus according to claim 1, further comprising:
   a filter that adjusts a wavelength of the light radiated from the emitter, and a pipe that supplies the air, the pipe extending to a position in the vicinity of the filter to which the air is directly applied.

7. A thermophotovoltaic power generating apparatus according to claim 1, further comprising:
   a filter that adjusts a wavelength of the light radiated from the emitter,
   a pipe that supplies the fuel; and
   a pipe that supplies the air; wherein the pipes that supply the fuel and the air are provided in a combustion chamber of the combustor in which the fuel is burned with the air.

8. A thermophotovoltaic power generating apparatus according to claim 1, further comprising a heat sink provided below the photoelectric conversion element that absorbs heat from the photoelectric conversion element and dissipating the heat to an outside of the thermophotovoltaic power generating apparatus.

9. A thermophotovoltaic power generating apparatus according to claim 1, wherein the emitter is porous.

10. A thermophotovoltaic power generating apparatus comprising:
   a combustor that receives a supply of a fuel and air for burning the fuel;
   an emitter that is heated upon passage of a combustion gas generated by the combustor through an interior of the emitter; and
   a photoelectric conversion element that converts light radiated from the emitter into electric power, wherein the emitter is disposed below the combustor, and the conversion element is disposed above the combustor.

11. A thermophotovoltaic power generating apparatus, comprising:
   a combustor that receives a supply of a fuel and air for burning the fuel;
   an emitter that is heated upon passage of a combustion gas generated by the combustor through an interior of the emitter; and
   a photoelectric conversion element that converts light radiated from the emitter into electric power, wherein the combustor is disposed between the emitter and the conversion element;
   and wherein a heat exchanger is disposed between the emitter and an exhaust pipe in a flow direction of the combustion gas.

12. A thermophotovoltaic power generating apparatus according to claim 11, wherein the emitter is disposed above the combustor.

13. A thermophotovoltaic power generating apparatus according to claim 11, wherein the conversion element is disposed above the combustor.

14. A method of generating thermophotovoltaic power comprising:
   burning fuel and air in a combustor;
   passing a combustion gas generated in the combustor through an emitter;
   radiating light from the emitter; and
   converting the light into electric power in a photoelectric conversion element, the combustor being disposed between the conversion element and the emitter, and a heat exchanger being disposed between the emitter and an exhaust pipe in a flow direction of the combustion gas.

15. The method of claim 14, wherein the conversion element is disposed below the combustor.

16. The method of claim 15, wherein the emitter is disposed above the combustor.

17. The method of claim 14, wherein the conversion element is disposed above the combustor.

18. The method of claim 16, wherein the emitter is disposed below the combustor.

19. The method of claim 14, further comprising guiding air to the combustor with a guide member.

20. The method of claim 14, further comprising adjusting a wavelength of the light from the emitter in a filter disposed below the combustor.

21. The method of claim 20, further comprising supplying the air via a pipe and directly applying the air to the filter.

22. The method of claim 14 further comprising exhausting the combustion gas.

23. The method of claim 14, further comprising premixing the fuel and air prior to combustion.

* * * * *